United States Patent
Lee et al.

(10) Patent No.: US 7,792,219 B2
(45) Date of Patent: Sep. 7, 2010

(54) APPARATUS AND METHOD FOR CORRECTING COMMON PHASE ERROR IN A MULTI-CARRIER COMMUNICATION SYSTEM

(75) Inventors: Joo-Hyun Lee, Suwon-si (KR);
Sang-Boh Yun, Seongnam-si (KR);
Ki-Young Han, Yongin-si (KR);
Young-Hoon Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 532 days.

(21) Appl. No.: 11/862,710

(22) Filed: Sep. 27, 2007

(65) Prior Publication Data
US 2008/0075205 A1 Mar. 27, 2008

(30) Foreign Application Priority Data
Sep. 27, 2006 (KR) .................. 10-2006-0094156

(51) Int. Cl.
*H03K 9/00* (2006.01)
*H04L 27/00* (2006.01)

(52) U.S. Cl. .............. 375/316; 375/343; 375/371; 375/375

(58) Field of Classification Search .......... 375/316, 375/343, 371, 375
See application file for complete search history.

(56) References Cited

U.S. PATENT DOCUMENTS

| 7,668,246 | B2 | 2/2010 | Zhidkov et al. |
| 2005/0078599 | A1 | 4/2005 | Zhidkov et al. |
| 2006/0109921 | A1* | 5/2006 | Ji et al. ............... 375/260 |

FOREIGN PATENT DOCUMENTS

KR 10-2005-0034885 A 4/2005

* cited by examiner

*Primary Examiner*—Curtis B Odom
(74) *Attorney, Agent, or Firm*—Jefferson IP Law, LLP

(57) ABSTRACT

An apparatus and method for correcting a CPE in a signal reception apparatus of a multi-carrier communication system are provided, in which an auto-correlation of a reference signal estimated from a reference symbol among a plurality of symbols is detected, a cross-correlation between a channel estimate of the reference signal and an actual received reference signal is detected, and the CPE of the remaining symbols except the reference symbol is corrected using the auto-correlation and the cross-correlation.

20 Claims, 6 Drawing Sheets

APPARATUS AND METHOD FOR CORRECTING COMMON PHASE ERROR IN A MULTI-CARRIER COMMUNICATION SYSTEM

PRIORITY

This application claims the benefit under 35 U.S.C. §119(a) of a Korean patent application filed in the Korean Intellectual Property Office on Sep. 27, 2006 and assigned Serial No. 2006-94156, the entire disclosure of which is hereby incorporated by reference.

BACKGROUND OF THE INVENTION

1. Field of the Invention

The present invention generally relates to an apparatus and method for correcting Common Phase Error (CPE) in a communication system. More particularly, the present invention relates to an apparatus and method for correcting CPE in a multi-carrier communication system.

2. Description of the Related Art

In general, future-generation communication systems are under development to provide services that enable high-rate large-data transmission/reception to Mobile stations (MSs). In this context, a multi-carrier scheme, for example, Orthogonal Frequency Division Multiplexing (OFDM) is considered promising for the high-rate large-data transmission/reception.

However, a receiver in an OFDM communication system is very sensitive to phase noise caused by insufficient isolation in a local oscillator or a signal path. The phase noise may appear in a transmitter as well as in the receiver. The phase noise is an unintended additive phase modulation component, which is resolved into CPE and Inter-Carrier Interference (ICI) after Fast Fourier Transform (FFT) in the receiver. The ICI increases the variance of a detected signal in the receiver, and the CPE rotates the entire signal of one OFDM symbol equally. Hence, CPE correction is very significant in improving reception performance.

CPE correction can be carried out in three ways. One CPE correction strategy is to improve the accuracy of a device itself such as a local oscillator. Another CPE correction strategy is to reinforce isolation in a signal path, and A third CPE correction strategy is to estimate the phase difference between a transmitted signal point and a received signal point on a signal constellation.

The first and second CPE correction strategies correct the CPE in hardware, whereas the third CPE strategy is a software-based CPE correction solution. The first and second CPE correction strategies are limited in their use because the requirement for increased device accuracy leads to a cost increase. Even at the sacrifice of cost, an amplifier becomes unstable during lamp-up/down when the amplifier turns on/off in a Time Division Duplexing (TDD) communication system. That is why the third CPE correction strategy is usually adopted.

With reference to FIG. 1, a description will be made below of a soft-decision value including a CPE output from the receiver, when the transmitter uses Quadrature Phase Shift Keying (QPSK) in the OFDM communication system.

FIG. 1 illustrates a soft-decision value including a CPE output from a receiver, when a transmitter uses QPSK in a conventional OFDM communication system.

Referring to FIG. 1, the vertical axis is an imaginary (im) axis and the horizontal axis is a real (re) axis. $\phi_i$ denotes the average phase difference (i.e. CPE) on a signal constellation between the soft-decision values of OFDM symbol #i at a receiver and a QPSK symbol for OFDM symbol #i transmitted by the transmitter. Here, i denotes an OFDM symbol index.

With reference to FIG. 2, the internal structure of a CPE correction apparatus of the receiver in the OFDM communication system will be described.

FIG. 2 is a block diagram of a CPE correction apparatus of a receiver in a conventional OFDM communication system.

Referring to FIG. 2, the CPE correction apparatus includes an FFT unit 211, a frequency-domain equalizer 213, a subcarrier selector 215, an argument calculator (arg(·)) 217, a hard-decision unit 219, an argument calculator (arg(·)) 221, a subtractor 223, a mean calculator (mean(·)) 225, a conjugate exponent calculator (exp{−j(·)}) 227, a multiplier 229, a detector 231, and a moving average filter 233.

Upon input of a received signal, the FFT unit 211 performs FFT on the received signal and provides data subcarrier signals, that is, traffic subcarrier signals among the FFT signals to the frequency-domain equalizer 213. The traffic subcarrier signals are the soft-decision values $y_{n,t}^i$ of traffic subcarriers, given as in equation (1), $$y_{n,t}^i = (h_{n,t}^i)^* r_{n,t}^i \quad (1)$$

where i denotes an OFDM symbol index, n denotes a receive antenna index, $h_{n,t}^i$ denotes the channel value of traffic subcarrier #t of OFDM symbol #i received through receive antenna #n, and r denotes a signal received on traffic subcarrier #t of OFDM symbol #i through receive antenna #n.

The frequency-domain equalizer 213 equalizes the soft-decision values $y_{n,t}^i$ in the frequency domain in accordance with a CPE estimate $\hat{\phi}_i$ received from the moving average filter 233 and outputs the equalized signals $\hat{y}_{n,t}^i$ to the subcarrier selector 215 and the multiplier 229. The subcarrier selector 215 selects a signal with the highest value $\hat{y}_{n,d}^i$ from among the signals $\hat{y}_{n,t}^i$. Thus, $\hat{y}_{n,d}^i$ is the maximum frequency-domain equalized soft-decision value.

The argument calculator 217 calculates the argument (i.e. phase) $\angle \hat{y}_{n,d}^i$ of the signal $\hat{y}_{n,d}^i$ received from the subcarrier selector 215. The hard-decision unit 219 calculates the hard-decision value $s_{n,d}^i$ of the signal $\hat{y}_{n,d}^i$. The argument calculator 221 calculates the argument (i.e. phase) $\angle s_{n,d}^i$ of the hard-decision value $s_{n,d}^i$.

The subtractor 223 subtracts the phase $\angle s_{n,d}^i$ received from the argument calculator 221 from the phase $\angle \hat{y}_{n,d}^i$ received from the argument calculator 217. The mean calculator 225 averages the difference signal received from the subtractor 223, thereby estimating the CPE. The CPE estimate $\hat{\phi}_i$ is computed by equation (2).

$$\hat{\phi}_i = \angle \hat{y}_{n,d}^i - \angle s_{n,d}^i \quad (2)$$

The conjugate exponent calculator 227 calculates the conjugate exponent $\exp\{-j\hat{\phi}_i\}$ of the CPE estimate $\hat{\phi}_i$ received from the mean calculator 225. The multiplier 229 multiplies a signal received from the frequency-domain equalizer 213 by the conjugate exponent $\exp\{-j\hat{\phi}_i\}$. That is, the multiplier 229 corrects the CPE by multiplying an OFDM symbol following the current OFDM symbol, i.e. OFDM symbol #i+1 by $\exp\{-j\hat{\phi}_i\}$. The detector 231 finally detects the signal transmitted by the transmitter using the CPE-corrected signal.

Meanwhile, the moving average filter 233 updates its filter coefficient with the CPE estimate $\hat{\phi}_i$ received from the mean calculator 225 and provides the CPE estimate $\hat{\phi}_i$ to the frequency-domain equalizer 213.

As described above, since the software-based CPE correction strategy uses traffic subcarriers, it is very effective in terms of overhead reduction. However, as the CPE estimate of the current OFDM symbol is compensated for in the next OFDM symbol, an accurate CPE correction is impossible if the CPE changes fast, OFDM symbol by OFDM symbol.

With reference to FIG. 3, a description will be made of CPE-incurred change of Error Vector Magnitude (EVM) in each OFDM symbol in the OFDM communication system.

FIG. 3 is a graph illustrating CPE-incurred change of Error Vector Magnitude (EVM) in each OFDM symbol in a conventional OFDM communication system.

Referring to FIG. 3, the graph illustrates change of EVM caused by CPE in every OFDM symbol when the transmitter uses four transmit antennas, Tx.ANT #1 to Tx.ANT#4. Even though the transmitter and the receiver transmit and receive a signal without forced insertion of noise, the EVM is not infinite due to a variety of hardware factors. Especially, the EVM that changes in every OFDM symbol reflects CPE-caused performance degradation indirectly. As noted from FIG. 3, the CPE is highly probable to randomly occur on an OFDM symbol basis unlike frequency offset. When the CPE rapidly changes OFDM symbol by OFDM symbol, the software-based CPE correction strategy described with reference to FIG. 2 is not viable.

The software-based CPE correction is impossible in the case where the receiver uses a decoder without hard decision, such as a turbo code and a Low Density Parity Check (LDPC) code under active consideration for future-generation communication systems. If ever the software-based CPE correction is possible, an additional hard decision unit for performing hard decision on all possible candidate symbols is required, thereby increasing hardware complexity.

Since CPE estimation relies on traffic subcarriers, the software-based CPE correction strategy has a degraded CPE estimation performance if the traffic subcarriers are in poor channel status.

SUMMARY OF THE INVENTION

An aspect of exemplary embodiments of the present invention is to address at least the above-mentioned problems and/or disadvantages and to provide at least the advantages described below. Accordingly, an aspect of the present invention is to provide an apparatus and method for correcting CPE in a multi-carrier communication system.

Another aspect of the present invention is to provide an apparatus and method for correcting CPE according to a channel environment in a multi-carrier communication system.

In accordance with an aspect of the present invention, a method for correcting a CPE in a signal reception apparatus of a multi-carrier communication system is provided. In the method, an auto-correlation of a reference signal estimated from a reference symbol among a plurality of symbols is detected, a cross-correlation between a channel estimate of the reference signal and an actual received reference signal is detected, and the CPE of the remaining symbols except the reference symbol is corrected using the auto-correlation and the cross-correlation.

In accordance with another aspect of the present invention, a method for correcting a CPE in a signal reception apparatus of a multi-carrier communication system is provided. In the method, channel estimates of reference signals are detected in two reference symbols among a plurality of symbols, a new channel estimate is generated using the channel estimates of the reference symbols according to a channel estimation scheme, an auto-correlation of a reference signal estimated from each of the remaining symbols except the reference symbols is detected, a cross-correlation between the new channel estimate and an actual received reference signal of the each symbol is calculated, and the CPE of the each symbol is corrected using the auto-correlation and the cross-correlation.

In accordance with a further aspect of the present invention, an apparatus for correcting a CPE in a signal reception apparatus of a multi-carrier communication system is provided. In the apparatus, a CPE corrector detects an auto-correlation of a reference signal estimated from a reference symbol among a plurality of symbols and a cross-correlation between a channel estimate of the reference signal and an actual received reference signal, and generates a CPE correction value using the auto-correlation and the cross-correlation, and a multiplier corrects the CPE of the remaining symbols except the reference symbol using the CPE correction value.

In accordance with still another aspect of the present invention, an apparatus for correcting a CPE in a signal reception apparatus of a multi-carrier communication system is provided. In the apparatus, a CPE corrector detects channel estimates of reference signals in two reference symbols among a plurality of symbols, generates a new channel estimate using the channel estimates of the reference symbols according to a channel estimation scheme, detects an auto-correlation of a reference signal estimated from each of the remaining symbols except the reference symbols and a cross-correlation between the new channel estimate and an actual received reference signal of the each symbol, and generates a CPE correction value using the auto-correlation and the cross-correlation, and a multiplier corrects the CPE of the each symbol using the CPE correction value.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for correcting CPE in a multi-carrier communication system, for example, an OFDM communication system. More particularly, exemplary embodiments of the present invention provide an apparatus and method for correcting CPE, taking into account a quasi-static channel environment and a variable channel environment, respectively in an OFDM communication system. A quasi-static channel is defined as a channel that is maintained unchanged for L OFDM symbols, and a variable channel is defined as a channel that changes OFDM symbol by OFDM symbol.

A CPE correction method for a quasi-static channel environment in the OFDM communication system will first be described below.

Figure 1:
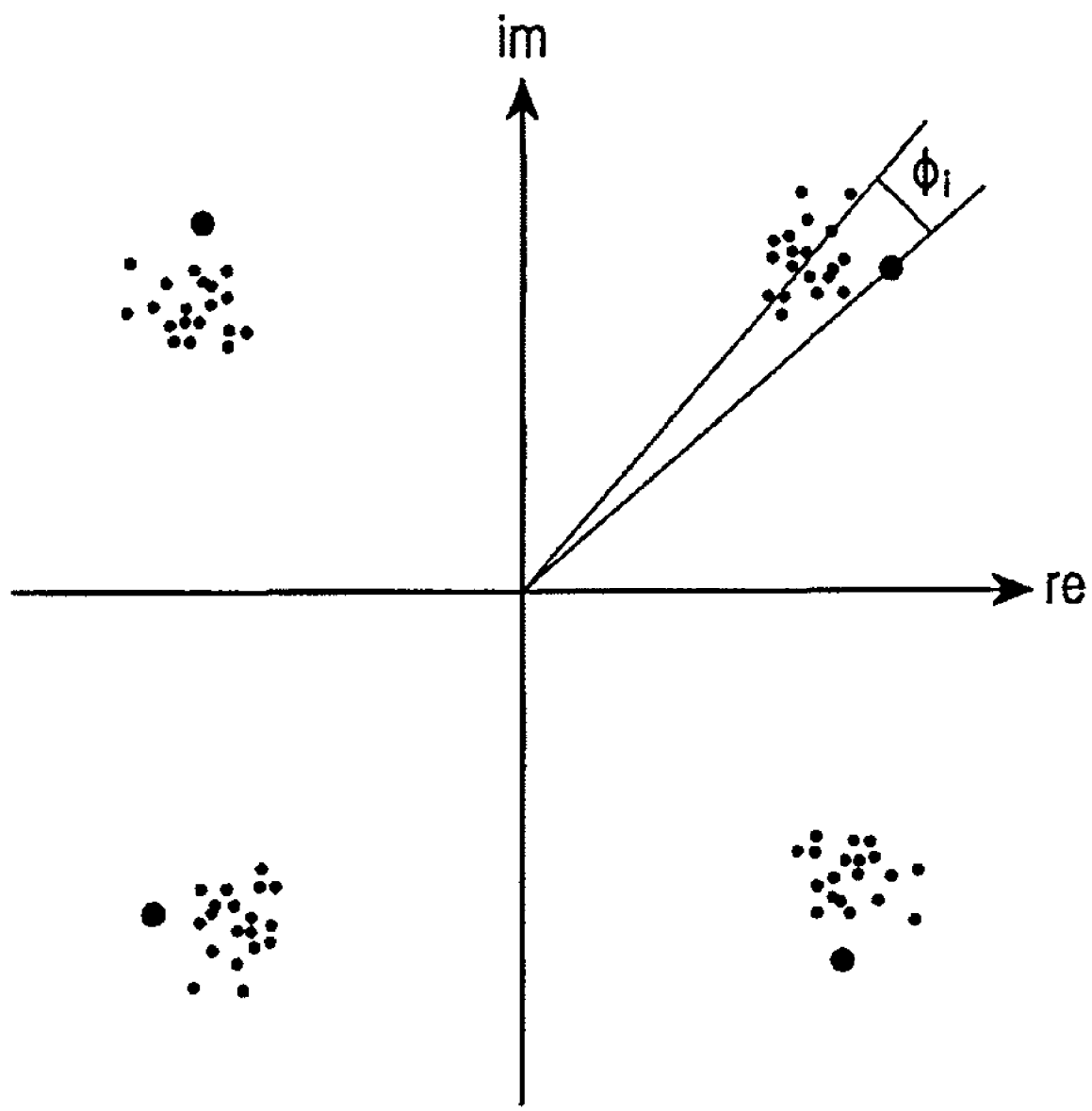
FIG. 1 illustrates a soft-decision value including a CPE output from a receiver, when a transmitter uses QPSK in a conventional OFDM communication system.
Figure 2:
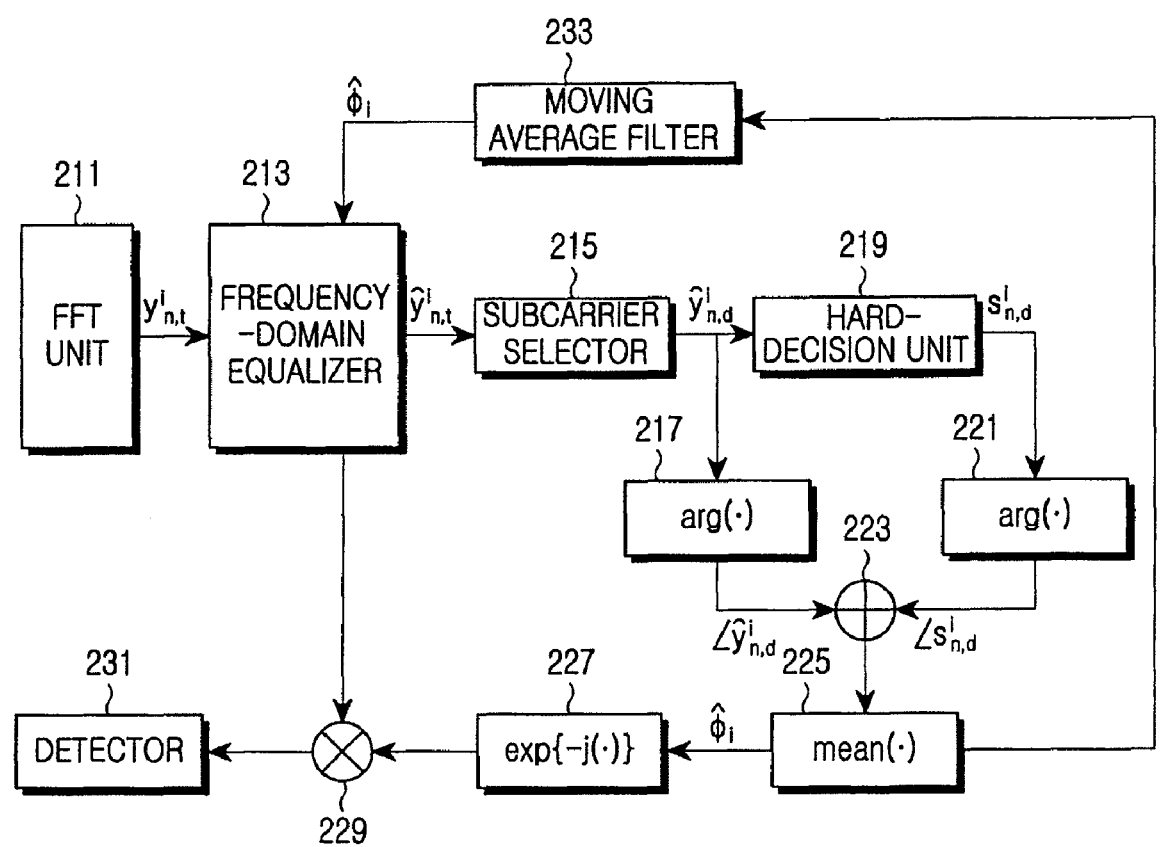
FIG. 2 is a block diagram of a CPE correction apparatus of a receiver in a conventional OFDM communication system.
Figure 3:
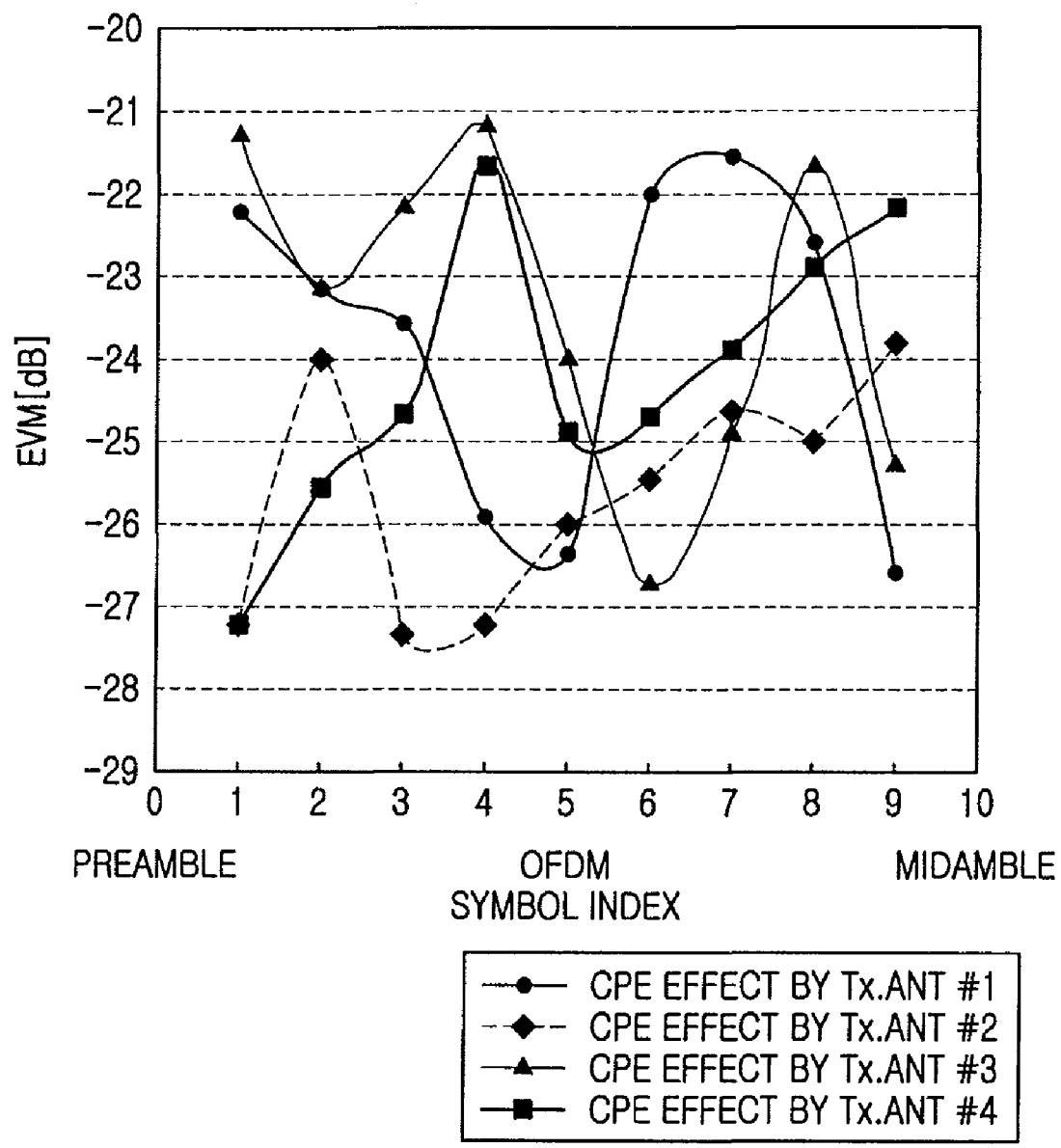
FIG. 3 is a graph illustrating CPE-incurred change of EVM in each OFDM symbol in a conventional OFDM communication system.
Figure 4:
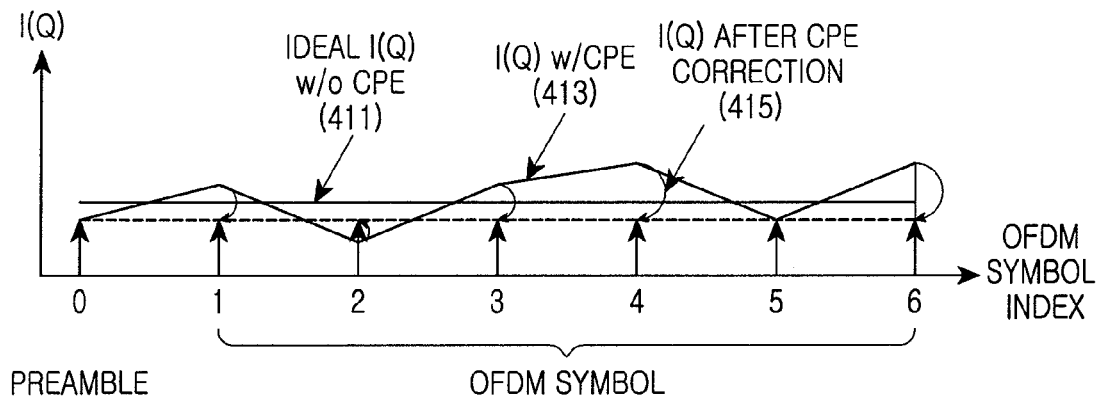
FIG. 4 illustrates a CPE correction method in a quasi-static channel environment in an OFDM communication system according to an exemplary embodiment of the present invention.

FIG. 4 illustrates a CPE correction method in a quasi-static channel environment in an OFDM communication system according to an exemplary embodiment of the present invention.

Referring to FIG. 4, it is assumed that one frame includes L OFDM symbols and a quasi-static channel is maintained unchanged for the L OFDM symbols. Under an ideal circumstance without CPE, an In-phase (I) or Quadrature-phase (Q) signal on pilot subcarrier #p takes the form 411 because the quasi-static channel does not change over time. The pilot subcarrier signal is a reference signal. The ideal I or Q signal 411 is changed to an I or Q signal 413 if the CPE occurs on an OFDM symbol basis.

Since the changed I or Q signal 413 degrades the overall performance of the OFDM communication system, it is corrected to an I or Q signal 415 with respect to a reference OFDM symbol, for example, a preamble. The correction of the I or Q signal 413 to the I or Q signal 415 is referred to as CPE correction.

For a receiver with $N_R$ receive antennas, let an ideal CPE-free signal for sample #k of OFDM symbol #i received through receive antenna #n be denoted by $\tilde{r}_{n,k}^i$. Then, a received signal including a CPE $r_{n,k}^i$ is expressed as in equation (3), $$r_{n,k}^i = \tilde{r}_{n,k}^i e^{j(\phi_i + n_\phi)}, \quad i=0, 1, \ldots, L-1 \tag{3}$$

where i denotes an OFDM symbol index, $\hat{\phi}_i$ denotes the CPE of OFDM symbol #i, and $n_\phi$ denotes white phase noise. OFDM symbol #i with i=0 is a preamble, and OFDM symbol #i with i=L is a midamble.

For convenience' sake, OFDM symbol #0 is set as the preamble, i.e. the reference OFDM symbol. In this case, $\phi_0$ can be set to 0 ($\phi_0=0$). Assuming that a Mobile Station (MS) is allocated $N_c$ subchannels, each having $N_p$ pilot subcarriers and a set of $N_c \times N_p$ pilot subcarrier indexes is denoted by $A_p$, a received signal $r_p^i$ on pilot subcarrier #p of post-FFT OFDM symbol #i in the receiver is given as in equation (4), $$r_p^i = h_p^i e^{j(\phi_i + n_\phi)} s_p^i + n_p^i \tag{4}$$

where p is an element of the pilot subcarrier index set $A_p$ and $r_p = [r_{1,p}\ r_{2,p}\ \ldots\ r_{N_R,p}]^T$ a signal vector received on pilot subcarrier #p through the $N_R$ receive antennas. T denotes transpose.

Assuming that the effective channels between receive antenna #n and $N_T$ transmit antennas are given by $$\tilde{h}_{n,p} = \sum_{m=1}^{N_T} h_{n,p}^m$$

where m denotes a transmit antenna index, $h_p = [\tilde{h}_{1,p}\ \tilde{h}_{2,p}\ \ldots\ \tilde{h}_{N_R,p}]^T$ is the channel vector of pilot subcarrier #p for the $N_R$ receive antennas and $n_p = [n_{1,p}\ n_{2,p}\ \ldots\ n_{N_R,p}]^T$ is the noise vector of pilot subcarrier #p for the $N_R$ receive antennas. $s_p^i$ is described in equation (5). A pilot channel is a set of pilot subcarriers in one OFDM symbol. As described with reference to FIG. 4, because the channel of the reference OFDM symbol (i.e. the preamble) corresponds to that of the entire OFDM symbols in the frame, the pilot channel estimate of the entire OFDM symbols is identical to that of the preamble, as described in equation (5), $$\hat{r}_p^i = r_p^0 \tag{5}$$

where $r_p^0$ denotes the pilot channel estimate of the preamble and $\hat{r}_p^i$ denotes the pilot channel estimate of OFDM symbol #i.

CPE correction is carried out by estimating the exponent of the CPE, rather than estimating the CPE itself, and then correcting the CPE with the conjugate of the exponent. The conjugate is a correction value with which to correct the CPE. The exponent of the CPE can be detected using the ratio between an auto-correlation being the power of a pilot channel estimate of each OFDM symbol and a cross-correlation between the pilot channel estimate and an actual pilot channel signal.

The average power of the pilot channel in the preamble is computed by equation (6), $$\begin{aligned} P_0 &= E[\{\hat{r}_{n,p}^i\}^* \hat{r}_{n,p}^i] \\ &= E[\{r_{n,p}^0\}^* r_{n,p}^0] \\ &\approx \frac{1}{N_R N_c N_p} \sum_{n=1}^{N_R} \sum_{p \in A_p}^{N_c N_p} [\{\tilde{h}_{n,p}^0 s_p\}^* \tilde{h}_{n,p}^0 s_p + \{n_{n,p}^0\}^* n_{n,p}^0] \\ &= \frac{1}{N_R N_c N_p} \sum_{n=1}^{N_R} \sum_{p \in A_p}^{N_c N_p} |h_{n,p}^0|^2 + \sigma_n^2 \end{aligned} \tag{6}$$

where $P_0$ denotes the average power of the pilot channel in the preamble. Considering that noise and the pilot channel are independent of each other, it is assumed that noise is negligible if the number of pilot subcarriers to be averaged is large enough. Thus, the average power of the pilot channel is approximated in equation (6). $\sigma_n^2$ denotes the variance of noise at receive antenna #n.

The cross-correlation between the pilot channel estimate being a reference for the quasi-static channel and the pilot channel signal of OFDM symbol #i is computed by equation (7), $$C_{0,i} = E[\{\hat{r}_{n,p}^i\}^* r_{n,p}^i] \qquad (7)$$

$$= E[\{r_{n,p}^0\}^* r_{n,p}^i]$$

$$\approx \frac{1}{N_R N_c N_p} \sum_{n=1}^{N_R} \sum_{p \in A_p}^{N_c N_p} \left[ \{h_{n,p}^0 s_p\}^* h_{n,p}^i e^{j(\phi_i + n_\phi)} s_p + \{n_{n,p}^0\}^* n_{n,p}^i \right]$$

$$= \frac{1}{N_R N_c N_p} \sum_{n=1}^{N_R} \sum_{p \in A_p}^{N_c N_p} |h_{n,p}^0|^2 e^{j(\phi_i + n_\phi)}$$

where $C_{0,i}$ denotes the cross-correlation between the pilot channels of the preamble and OFDM symbol #i.

If the Signal-to-Noise Ratio (SNR) of the received signal is so high that $\sigma_n^2 \ll 1$, the exponent of the CPE for OFDM symbol #i is estimated by equation (8).

$$e^{j\phi_i} = C_{0,i}/P_0 \approx E[e^{j\phi_i}] \qquad (8)$$

The exponent estimate of the CPE for one OFDM symbol is equal in different subchannels as far as the subchannels are allocated to the same MS. For the downlink of an Orthogonal Frequency Division Multiple Access (OFDMA) communication system, therefore, the CPE can be corrected by multiplying the received signal $r_{n,t}^i$ or the channel estimate $h_{n,t}^m$ by the conjugate of the exponent of the CPE. For the uplink of the OFDMA communication system, since a plurality of MSs can be allocated to one OFDM symbol, it is efficient to correct a CPE in the channel estimate of each MS.

Hence, correction of the CPE estimate in data subcarrier #t, i.e. traffic subcarrier #t is expressed as in equation (9) or equation (10), $$\tilde{h}_{n,t}^i = \hat{h}_{n,t}^i (e^{j\phi_i})^* \qquad (9)$$

$$\tilde{r}_{n,t}^i = r_{n,t}^i (e^{j\phi_i})^* \qquad (10)$$

where i=1, 2, ..., L−1 and t=0, 1, ..., $N_{data}$−1. $N_{data}$ denotes the number of traffic subcarriers allocated to the MS in one OFDM symbol.

Now a description will be made of a CPE correction method for a variable channel environment.

Because a channel changes in every OFDM symbol in the variable channel environment, it is very difficult to estimate a CPE using a preamble. There are two CPE estimation methods for the variable channel environment, which are a first CPE estimation method and a second CPE estimation method.

The first CPE estimation method for the variable channel environment will be described with reference to FIG. 5.

Figure 5:
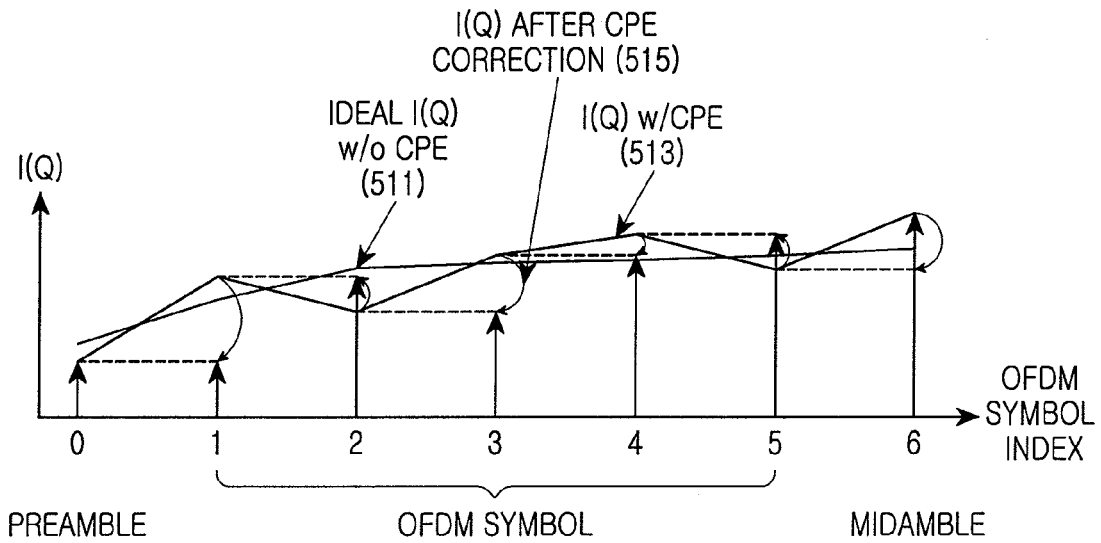
FIG. 5 illustrates a CPE estimation method for CPE correction in a variable channel environment in an OFDM communication system according to an exemplary embodiment of the present invention.

FIG. 5 illustrates a CPE estimation method for CPE correction in a variable channel environment in an OFDM communication system according to an exemplary embodiment of the present invention.

Before describing FIG. 5, it is clarified that the first CPE estimation method estimates a CPE by designating the first of B OFDM symbols as a reference OFDM symbol on the assumption that a channel is maintained unchanged for the B successive OFDM symbols (B is preset) despite the variable channel environment.

Referring to FIG. 5, assuming that a channel is not changed for B OFDM symbols, for example, five OFDM symbols, the first OFDM symbol of the five OFDM symbols, OFDM symbol #1 is set as a reference OFDM symbol. Then, CPE correction is carried out in the same manner as done for the quasi-static channel, as described with reference to FIG. 4.

Reference numeral 511 denotes an ideal I or Q signal. In an actual channel environment, the ideal I or Q signal takes the form 513. Since the channel is maintained unchanged for five OFDM symbols, the signal 513 is changed to a signal 515 by correcting a CPE using OFDM symbol #1 as the reference OFDM symbol.

In the case where an MS moves relatively slow and thus the channel does not change much, the five OFDM symbols form a quasi-static channel environment. Therefore, the CPE is corrected in the same manner as with the quasi-static channel. However, if the MS moves fast, increasing the Doppler effect, the CPE estimation performance of the first CPE estimation method is degraded. To prevent the CPE estimation performance degradation caused by the velocity increase of the MS, the second CPE estimation method for the variable channel environment is proposed in an exemplary embodiment of the present invention.

The second CPE estimation method for the variable channel environment will be described with reference to FIG. 6.

Figure 6:
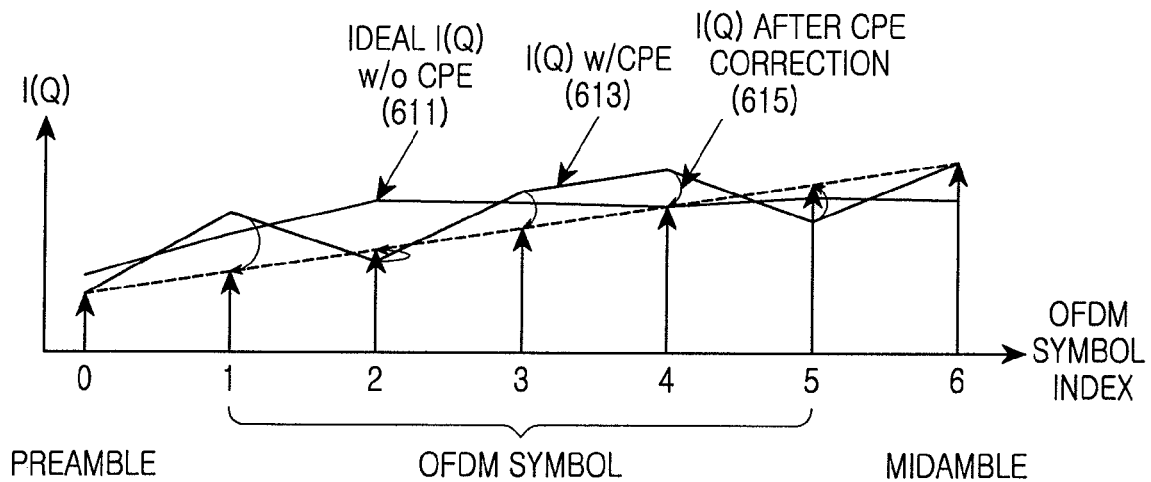
FIG. 6 illustrates another CPE estimation method for CPE correction in a variable channel environment in an OFDM communication system according to an exemplary embodiment of the present invention.

FIG. 6 illustrates another CPE estimation method for CPE correction in a variable channel environment in an OFDM communication system according to an exemplary embodiment of the present invention.

When the velocity of the MS increases, the first CPE estimation method has a degraded CPE estimation performance. In this context, a CPE is corrected in accordance with a pilot channel estimate of each OFDM symbol instead of that of a reference OFDM symbol. That is, assuming that the pilot channel estimate is accurate, the CPE is estimated in accordance with the pilot channel estimate and compensated for based on the CPE estimate.

Referring to FIG. 6, a linear interpolation-based channel estimation method is used for channel estimation. Assuming that a pilot channel estimate obtained by the linear interpolation-based channel estimation method is equal to an actual pilot channel value, a CPE can be corrected using the pilot channel estimate of a received signal, as described in equation (3), which will be described in great detail.

In the case of accurate synchronization acquisition, a received signal $r_p^i$ on pilot subcarrier #p of post-FFT OFDM symbol #i in the receiver is given as in equation (11).

$$r_p^i = h_p^i e^{j(\phi_i + n_\phi)} s_p^i + n_p^i \qquad (11)$$

The channel estimate of pilot subcarrier #p of OFDM symbol #i is computed by linear interpolation between the pilot channels of a preamble and a midamble, as in equation (12).

$$\hat{r}_p^i = \frac{(L-1)r_p^0 + i \cdot r_p^L}{L} \qquad (12)$$

$$\equiv \hat{h}_p^i s_p^0 + n_p^i, \quad i = 1, 2, \ldots, L-1$$

The channel estimate of pilot subcarrier #p of OFDM symbol #i is a reference phase signal for OFDM symbol #i. For a receiver with $N_R$ receive antennas, the average power of the estimated channel of pilot subcarrier #p of OFDM symbol #i is computed by equation (13).

$$P_0 = E[\{\hat{r}_p^i\}^* \hat{r}_p^i] \tag{13}$$

$$\approx \frac{1}{N_R N_p} \sum_{n=1}^{N_R} \sum_{p \in \{pilots\}}^{N_p} \left[ \{\hat{h}_{n,p}^i s_p^0\}^* \hat{h}_{n,p}^i s_p^0 + \{\hat{n}_{n,p}^i\}^* \hat{n}_{n,p}^i \right]$$

$$= \frac{1}{N_R N_p} \sum_{n=1}^{N_R} \sum_{p \in \{pilots\}}^{N_p} |\hat{h}_{n,p}^i|^2 + \sigma_N^2$$

If the channel estimate of pilot subcarrier #p is free of CPE, an ideal pilot channel estimate should be identical to the pilot channel estimate obtained by the linear interpolation. Thus, $\hat{r}_p^i = \tilde{r}_p^i$ and $\hat{h}_{n,p}^i = \tilde{h}_{n,p}^i$.

Therefore, the cross-correlation between the pilot subcarrier signal obtained by the interpolation in OFDM symbol #i and an actual received pilot subcarrier signal in OFDM symbol #i is computed by equation (14).

$$C_i = E[\{\hat{r}_p^i\}^* r_p^i] \tag{14}$$

$$\approx \frac{1}{N_R N_p} \sum_{n=1}^{N_R} \sum_{p \in \{pilots\}}^{N_p} \left[ \{\hat{h}_{n,p}^i s_p^0\}^* h_{n,p}^i s_p^0 + \{n_{n,p}^i\}^* n_{n,p}^i \right]$$

$$= \frac{1}{N_R N_p} \sum_{n=1}^{N_R} \sum_{p \in \{pilots\}}^{N_p} \left[ \{\hat{h}_{n,p}^i s_p^0\}^* \tilde{h}_{n,p}^i e^{j(\phi_i + n\phi)} s_p^i \right] + \sigma_N^2$$

Assuming that the channel estimation is accurate in equation (14), that is, assuming that the actual pilot channel value is equal to the pilot channel estimate, $\hat{h}_{n,p}^i = \tilde{h}_{n,p}^i$ and since the receiver has prior knowledge of the pilot signal of each OFDM symbol, $s_p^0 = s_p^i$. Then, the cross-correlation described in equation (14) is simplified as in equation (15), $$C_i \approx \frac{1}{N_R N_p} \sum_{n=1}^{N_R} \sum_{p \in \{pilots\}}^{N_p} |\hat{h}_{n,p}^i|^2 e^{j(\phi_i + n\phi)} + \sigma_N^2 \tag{15}$$

Hence, if the SNR of the received signal is so high that $\sigma_n^2 \ll 1$, the exponent of the CPE for OFDM symbol #i is estimated by equation (16).

$$e^{j\phi_i} = C_i / P_i \approx E[e^{j\phi_i}] \tag{16}$$

Correction of the CPE for data subcarrier #t, i.e. traffic subcarrier #t of OFDM symbol #i using the exponent estimate of the CPE is described in equation (9) or equation (10).

In FIG. 6, reference numeral 611 denotes an ideal I or Q signal. In an actual channel environment, the ideal I or Q signal 611 takes the form 613. The signal 613 is changed to a signal 615 by correcting a CPE using the pilot channel estimate of each OFDM symbol.

A description will be made of the internal structure of a CPE correction apparatus in the receiver in an OFDM communication system according to an exemplary embodiment of the present invention with reference to FIG. 7.

Figure 7:
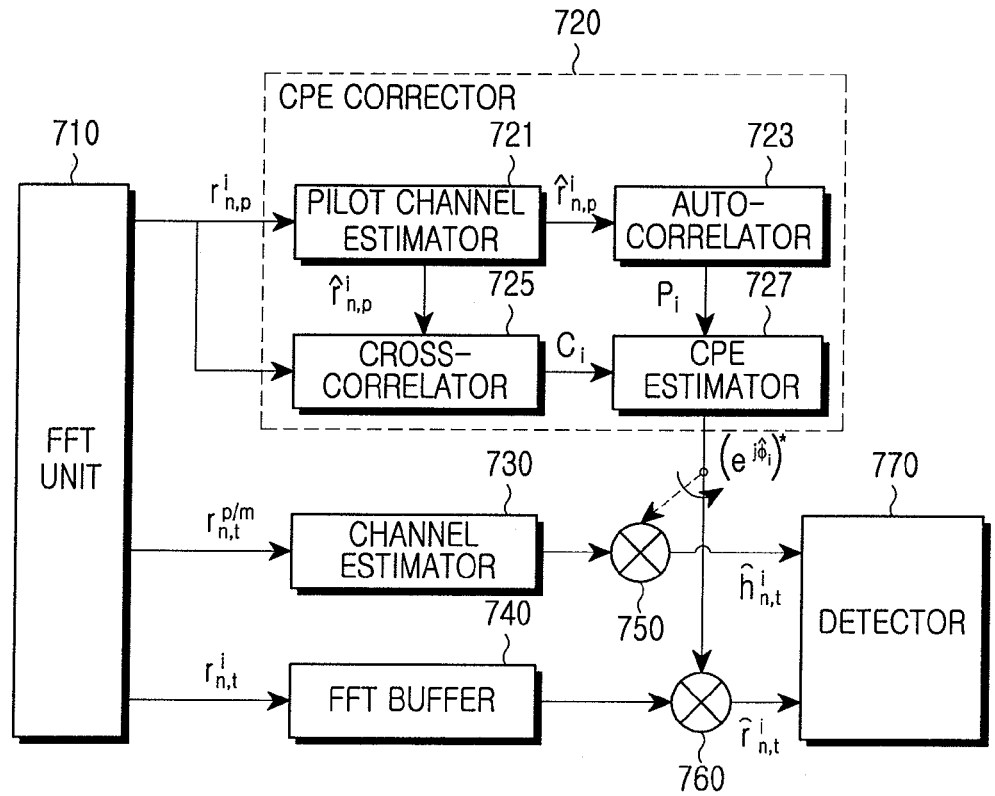
FIG. 7 is a block diagram of a CPE correction apparatus of a receiver in an OFDM communication system according to an exemplary embodiment of the present invention.

FIG. 7 is a block diagram of a CPE correction apparatus of a receiver in an OFDM communication system according to an exemplary embodiment of the present invention.

Referring to FIG. 7, the CPE correction apparatus includes an FFT unit 710, a CPE corrector 720, a channel estimator 730, an FFT buffer 740, a multiplier 750, a multiplier 760, and a detector 770. The CPE corrector 720 includes a pilot channel estimator 721, an auto-correlator 723, a cross-correlator 725, and a CPE estimator 727.

Upon input of a received signal, the FFT unit 710 performs FFT on the received signal, provides a pilot subcarrier signal $r_{n,p}^i$ to the pilot channel estimator 721 and the cross-correlator 725, provides a preamble/midamble $r_{n,t}^{p/m}$ to the channel estimator 730, and provides a traffic subcarrier signal $r_{n,t}^i$ to the FFT buffer 740.

The pilot channel estimator 721 performs channel estimation on the pilot subcarrier signal $r_{n,p}^i$ and outputs the pilot channel estimate $\hat{r}_{n,p}^i$ to the auto-correlator 723 and the cross-correlator 725. The auto-correlator 723 auto-correlates the pilot channel estimate $\hat{r}_{n,p}^i$, thus creating the auto correlation, i.e. the power value Pi of the pilot channel. The cross-correlator 725 cross-correlates the pilot channel estimate, $\hat{r}_{n,p}^i$, thus generating the cross-correlation Ci. The CPE estimator 727 estimates the exponent of a CPE using the power value Pi and the cross-correlation Ci and computes the conjugate of the exponent estimate, $(e^{j\phi_i})^*$.

Meanwhile, the channel estimator 730 performs channel estimation on the preamble/midamble $r_{n,t}^{p/m}$. The resulting channel estimate is called "traffic channel estimate" because it is to be applied to a traffic channel. The multiplier 750 multiplies the traffic channel estimate by the conjugate of the exponent estimate, $(e^{j\phi_i})^*$ received from the CPE estimator 727, thus producing the CPE-corrected channel value $\hat{h}_{n,t}^i$. The FFT buffer 740 buffers the traffic subcarrier signal $r_{n,t}^i$ and outputs it to the multiplier 760 at a predetermined time. The multiplier 760 multiplies the traffic subcarrier signal $r_{n,t}^i$ by the conjugate of the exponent estimate, $(e^{j\phi_i})^*$ resulting in the CPE-corrected traffic subcarrier signal $\hat{r}_{n,t}^i$.

The detector 770 recovers an actual traffic subcarrier signal transmitted by the transmitter using the CPE-corrected channel value $\hat{h}_{n,t}^i$ and the CPE-corrected traffic subcarrier signal $\hat{r}_{n,t}^i$.

Figure 8:
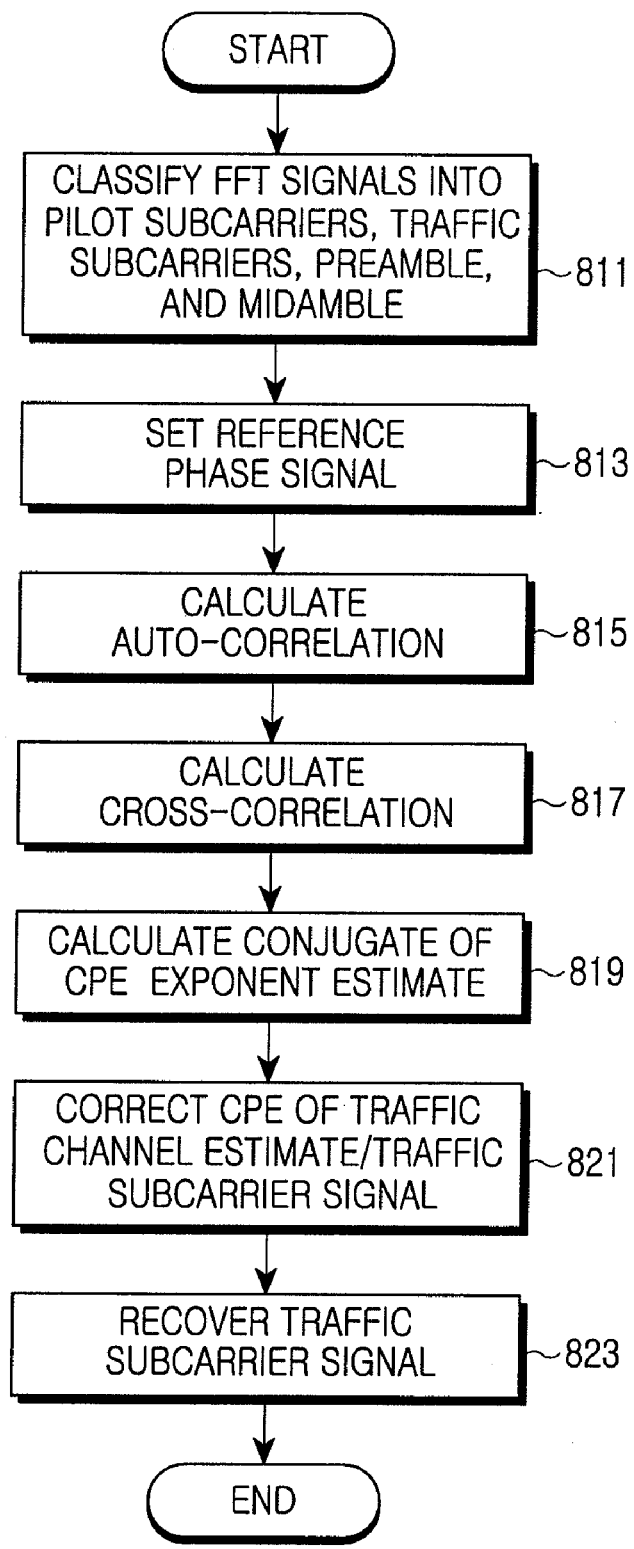
FIG. 8 is a flowchart illustrating a CPE correction operation in a CPE correction apparatus of a receiver in an OFDM communication system according to an exemplary embodiment of the present invention.

With reference to FIG. 8, a CPE correction operation in the CPE correction apparatus will be described.

FIG. 8 is a flowchart illustrating a CPE correction operation of a CPE correction apparatus in a receiver in an OFDM communication system according to an exemplary embodiment of the present invention.

Referring to FIG. 8, the CPE correction apparatus performs FFT on a received signal and classifies the FFT signals into a pilot subcarrier signal, a preamble/midamble and a traffic subcarrier signal in step 811.

In step 813, the CPE correction apparatus calculates a pilot channel estimate of an OFDM symbol through linear interpolation-based channel estimation of pilot channel values of a preamble and a midamble and sets the detected pilot channel estimate as a reference phase signal.

The CPE correction apparatus calculates the auto-correlation (i.e. power) of a pilot channel in the OFDM symbol in step 815 and calculates the cross-correlation between the pilot channel estimate and the pilot channel of the OFDM symbol in step 817. In step 819, the CPE correction apparatus generates a CPE exponent estimate using the auto-correlation and the cross-correlation and computes the conjugate of the exponent estimate, $(e^{j\phi_i})^*$.

In step 821, the CPE correction apparatus compensates for the conjugate of the exponent estimate, $(e^{j\phi_i})^*$ in a traffic channel estimate and a traffic subcarrier signal. The CPE correction apparatus recovers an actual traffic subcarrier signal transmitted by the transmitter using the CPE-corrected channel value $\hat{h}_{n,t}^i$ and the CPE-corrected traffic subcarrier signal $\hat{r}_{n,t}^i$ in step 823.

As is apparent from the above description, exemplary embodiments of the present invention advantageously enable CPE correction according to a channel environment in a multi-carrier communication system. That is, CPE correction is adapted to channel environment through adaptive control of a CPE correction method according to the channel environment in the multi-carrier communication system.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for correcting a Common Phase Error (CPE) in a signal reception apparatus of a multi-carrier communication system, the method comprising:
   detecting an auto-correlation of a reference signal estimated from a reference symbol among a plurality of symbols and a cross-correlation between a channel estimate of the reference signal and an actual received reference signal; and
   correcting the CPE of the remaining symbols except the reference symbol using the auto-correlation and the cross-correlation.

2. The method of claim 1, wherein the correcting of the CPE comprises:
   generating a ratio between the auto-correlation and the cross-correlation as the exponent of the CPE; and
   generating a conjugate of the exponent of the CPE and correcting the CPE of the remaining symbols except the reference symbol using the conjugate.

3. The method of claim 2, wherein the correcting of the CPE comprises performing at least one of correcting the CPE in a traffic signal of each of the remaining symbols using the conjugate and correcting the CPE in a traffic channel estimate of each of the remaining symbols using the conjugate.

4. The method of claim 1, wherein if the multi-carrier communication system is in a quasi-static channel environment with no change in channels, one frame comprises the plurality of symbols.

5. The method of claim 1, wherein if the multi-carrier communication system is in a variable channel environment with changes in channels, the plurality of symbols comprise symbols without channel changes among symbols included in one frame.

6. A method for correcting a Common Phase Error (CPE) in a signal reception apparatus of a multi-carrier communication system, the method comprising:
   detecting channel estimates of reference signals in two reference symbols among a plurality of symbols and generating a new channel estimate using the channel estimates of the reference symbols according to a channel estimation scheme; and
   detecting an auto-correlation of a reference signal estimated from each of the remaining symbols except the reference symbols and a cross-correlation between the new channel estimate and an actual received reference signal of the each symbol, and correcting the CPE of the each symbol using the auto-correlation and the cross-correlation.

7. The method of claim 6, wherein the correcting of the CPE comprises:
   generating a ratio between the auto-correlation and the cross-correlation as the exponent of the CPE; and
   generating a conjugate of the exponent of the CPE and correcting the CPE of the each symbol using the conjugate.

8. The method of claim 7, wherein the correcting of the CPE comprises performing at least one of correcting the CPE in a traffic signal of the each symbol using the conjugate and correcting the CPE in a traffic channel estimate of the each symbol using the conjugate.

9. The method of claim 6, wherein if the channel estimation method is linear interpolation, the new channel estimate comprises a linear interpolation channel estimate obtained by linear interpolation between the channel estimates of the reference symbols.

10. The method of claim 6, wherein the plurality of symbols comprise symbols included in one frame and one symbol included in another frame.

11. An apparatus for correcting a Common Phase Error (CPE) in a signal reception apparatus of a multi-carrier communication system, the apparatus comprising:
    a CPE corrector for detecting an auto-correlation of a reference signal estimated from a reference symbol among a plurality of symbols and a cross-correlation between a channel estimate of the reference signal and an actual received reference signal, and for generating a CPE correction value using the auto-correlation and the cross-correlation; and
    a multiplier for correcting the CPE of the remaining symbols except the reference symbol using the CPE correction value.

12. The apparatus of claim 11, wherein the CPE corrector generates a ratio between the auto-correlation and the cross-correlation as the exponent of the CPE, and generates a conjugate of the exponent of the CPE as the CPE correction value.

13. The apparatus of claim 12, wherein the multiplier performs at least one of correcting the CPE of a traffic signal of each of the remaining symbols by multiplying the traffic signal by the conjugate and correcting the CPE of a traffic channel estimate of each of the remaining symbols by multiplying the traffic channel estimate by the conjugate.

14. The apparatus of claim 11, wherein if the multi-carrier communication system is in a quasi-static channel environment with no change in channels, one frame comprises the plurality of symbols.

15. The apparatus of claim 11, wherein if the multi-carrier communication system is in a variable channel environment with changes in channels, the plurality of symbols comprise symbols without channel changes among symbols included in one frame.

16. An apparatus for correcting a Common Phase Error (CPE) in a signal reception apparatus of a multi-carrier communication system, the apparatus comprising:
    a CPE corrector for detecting channel estimates of reference signals in two reference symbols among a plurality of symbols, for generating a new channel estimate using the channel estimates of the reference symbols according to a channel estimation scheme, for detecting an auto-correlation of a reference signal estimated from each of the remaining symbols except the reference symbols and a cross-correlation between the new channel estimate and an actual received reference signal of the each symbol, and for generating a CPE correction value using the auto-correlation and the cross-correlation; and
    a multiplier for correcting the CPE of the each symbol using the CPE correction value.

17. The apparatus of claim 16, wherein the CPE corrector generates a ratio between the auto-correlation and the cross-correlation as the exponent of the CPE, and generates a conjugate of the exponent of the CPE and correcting the CPE of the each symbol as the CPE correction value.

18. The apparatus of claim 17, wherein the multiplier performs at least one of correcting the CPE of a traffic signal of the each symbol by multiplying the traffic signal by the conjugate and correcting the CPE of a traffic channel estimate of the each symbol by multiplying the traffic channel estimate by the conjugate.

19. The apparatus of claim 16, wherein if the channel estimation method is linear interpolation, the new channel estimate comprises a linear interpolation channel estimate obtained by linear interpolation between the channel estimates of the reference symbols.

20. The apparatus of claim 16, wherein the plurality of symbols comprise symbols included in one frame and one symbol included in another frame.

* * * * *